United States Patent Office 3,794,635
Patented Feb. 26, 1974

3,794,635
N-HETEROARYLIDENE ERYTHROMY-CYCLAMINES
Delme Evans, Chalfont St. Peter, England, assignor to Lilly Industries Limited, London, England
No Drawing. Filed Sept. 27, 1971, Ser. No. 184,220
Claims priority, application United Kingdom, Sept. 30, 1970, 46,403/70
Int. Cl. C07c *129/18*
U.S. Cl. 260—210 E          14 Claims

ABSTRACT OF THE DISCLOSURE

Derivatives of erythromycyl A amine, erythromycyl B amine and epi isomers thereof formed by reaction of the amine with heteroaryl aldehydes are useful as antibiotics and amoebicidal agents.

---

This invention relates to new antibiotic substances derived from erythromycin and to a process by which such substances may be prepared. The invention also provides pharmaceutical compositions comprising said new antibiotics in association with a pharmaceutically acceptable carrier or diluent therefor.

According to the present invention, new antibiotic substances are provided having the formula:

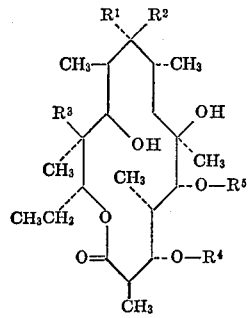

(I)

wherein $R^3$ is hydrogen or hydroxyl; $R^4$ is a cladinosyl group; $R^5$ is a desosaminyl group; and $R^1$ and $R^2$, which are different from one another, are hydrogen or a group of the formula:

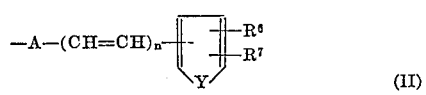

(II)

wherein A is an —N=CH— or —NH—$CH_2$— chain; $n$ is 0 or 1; $R^6$ and $R^7$ separately represent hydrogen, nitro, halogen, phenyl, $C_{1-4}$ alkyl or $C_{1-4}$ alkoxy or, when in adjacent positions, together represent a

—CH=CH—CH=CH— chain optionally substituted by halogen or $C_{1-4}$ alkyl; and Y represents O, S or $NR^8$ where $R^8$ is hydrogen, $C_{1-4}$ alkyl, phenyl or phenyl $C_{1-4}$ alkyl.

It will be seen that the compounds of Formula I are derivatives of 9S-amino-9-deoxy-9-dihydro-erythromycin, also known as erythromycylamine, and that the structural Formula I includes derivatives of erythromycyl A amine, erythromycyl B amine, and the stereo isomers, epi-erythromycyl A amine and epi-erythromycyl B amine. For the avoidance of doublt, derivatives of erythromycyl A, amine are those where $R^1$ is hydrogen and $R^3$ is hydroxyl; derivatives of erythromycyl B amine are those where $R^1$ and $R^3$ are hydrogen; derivatives of epi-erythromycyl A amine are those where $R^2$ is hydrogen and $R^3$ is hydroxyl; and derivatives of epi-erythromycyl B amine and those where $R^2$ and $R^3$ are hydrogen.

Preferred compounds of Formula I are those in which $R^1$ or $R^2$ is a group of Formula II wherein A and $n$ are as defined above; $R^6$ and $R^7$ separately represent hydrogen, chlorine, bromine or methyl or together represent a —CH=CH—CH=CH— chain optionally substituted by chlorine, bromine or methyl, and Y represents O, S or $NR^8$ where $R^8$ is hydrogen, methyl, phenyl or benzyl.

Most advantageously $R^1$ in Formula I is hydrogen i.e. the most preferred compounds of the present invention are derivatives of erythromycyl A or B amine.

According to a further feature of the present invention, there is provided a process for preparing the compounds of Formula I which comprises reacting the appropriate erythromycylamine with an aldehyde of the formula:

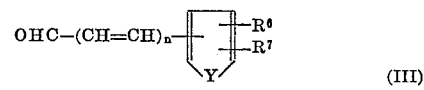

(III)

wherein $n$, $R_6$, $R_7$ and Y are as defined above, to produce a compound of Formula I in which $R^1$ or $R^2$ is a group of Formula II wherein A is an —N=CH— chain and thereafter optionally reducing the resultant Schiff's base to produce the corresponding compound in which A is an —NH—$CH_2$ chain.

The formation of the Schiff's bases of Formula I is accomplished in conventional manner by reacting the amine and aldehyde of Formula III in a suitable solvent such as isopropanol, the reaction normally being carried out at reflux for periods of up to 24 hours. Reduction of the Schiff's base is also accomplished in conventional manner, preferably using as reducing agent sodium borohydride in a suitable reaction solvent such as methanol.

The compounds of Formula I are useful as antibiotics, being particularly active both in vitro and vivo against gram-positive organisms. Thus, in vitro using the gradient plate technique, the compounds of Formula I possess MIC's (minimum inhibitory concentrations) against *Staphylococcus aureus* 6718 and U125 of from 0.25 to 8.0 µg./ml. and against *Streptococcus faecalis* 8213 of from 0.5 to 8.0 µg./ml. By in vivo tests in mice against *Streptococcus pyogenes* C203, the compounds of Formula I have been shown to possess $ED_{50}$'s of from 20 to 40 mg./kg. by the oral route and from 1 to 3 mg./kg. by the subcutaneous route. The compounds of Formula I also possess useful amoebicidal activity as evidenced by the fact that they are from 50 to 100% effective against *Entamoeba histolytica* in rate following 5 doses of 300 mg./kg. It can be seen therefore that the compounds of Formula I possess a similar spectrum of activity to that of erythromycin and accordingly may be employed in the same manner as erythromycin for treating infections in mammals and birds caused by various microorganisms. When so employed, the compounds of Formula I will normally be administered in dosages ranging from 0.5 to 3 g. per day. For such administration, pharmaceutical compositions comprising a compound of Formula I in association with a pharmaceutically acceptable diluent or carrier therefor will normally be employed and accordingly such compositions form a part of this invention. Such compositions may consist of at least one compound of Formula I mixed with a carrier, or diluted by a carrier, or enclosed or encapsulated by a carrier in the form of a capsule or other container. A diluent may be a solid, semi-solid or liquid material which serves as a vehicle, excipient or medium for the active therapeutic substance. Such diluents and carriers are of course well known in the pharmaceutical art. Preferably the compounds of Formula I are administered orally in the form of tablets, capsules or suspensions.

The compounds of Formula I may also be used to control the growth of staphylococci and streptococci present on equipment, furnishings, walls and floors in dental and medical offices, surgeries and hospitals. For such use, the compounds are dissolved in water, normally together with a surface active agent, and the solution applied to the surfaces requiring treatment. The compounds of Formula I may of course also be added to commercially available disinfectant preparations to confer greater bactericidal action.

The following examples illustrate methods by which the erythromycylamine starting materials of the process of the present invention may be prepared:

EXAMPLE A

Erythromycin hydrazone (15 g.) was dissolved in methanol (300 ml.) and sodium nitrite (7.5 g.) added. Water (approx. 30 ml.) was added to dissolve the sodium nitrite. The solution was cooled to 0–5° C. and 3 N hydrochloric acid (45 ml.) added dropwise at such a rate that the temperature did not exceed 10° C. 2 N sodium hydroxide was added to the cooled solution to bring the pH to 8.0 Sodium borohydride (0.6 g.) was added and the solution stirred for 30 minutes at 10° C. The pH of the solution was adjusted to 2.5 by addition of HCl and the solution stood for 10 minutes. The product was isolated by extraction into methylene chloride (X3) from an aqueous solution at pH 11.0. The combined extracts were dried (MgSO$_4$) and the solvent removed under reduced pressure to yield erythromycyl A amine as a glossy solid, which on crystallization from diethyl ether yielded the A amine in crystalline form, M.P. 125–128° C.

Similarly from erythromycin B hydrazone, there was obtained erythromycyl B amine as a white amorphous solid having a pK$_a$ in DMF of 9.7 for the primary amino group and 8.3 for the dimethylamino group of the desosamine moiety.

EXAMPLE B

Erythromycin A oxime (2.5 g.) was dissolved in methanol (450 ml.). Raney nickel (50 g.) was added and the resultant mixture hydrogenated in a high pressure hydrogenation bomb at a hydrogen pressure of 1000 p.s.i. for 24 hours whilst being stirred at 1000 r.p.m. After hydrogenation was completed, the catalyst was filtered off and the filtrate evaporated under reduced pressure. The residue was dissolved in water to which sufficient dilute aqueous hydrochloric acid was added to give a solution of pH 4.5. The solution was washed with methylene chloride and the pH adjusted to 8.5 by addition of 10% sodium hydroxide. After further washing with methylene chloride, the pH was further adjusted to 10.5 with 10% sodium hydroxide. The epi-erythromycyl A amine present in the solution was extracted with methylene chloride, the methylene chloride layer separated and the solvent removed in vacuo leaving epi-erythromycyl A amine as an amorphous residue. Crystallization of the residue from ether yields the crystalline epi-amine, M.P. 178–180° C.

Similarly, epi-erythromycyl B amine was prepared from erythromycin B oxime.

The following examples illustrate the preparation of compounds of the present invention:

EXAMPLE 1

A solution containing erythromycylamine (5 g., 6.8 mmoles) and 5-methylthiophene-2-aldehyde (0.86 g., 6.8 mmoles) in isopropanol (30 ml.) was boiled under reflux for 16 hours. Thin layer chromatography showed that a single compound was formed. The solvent was evaporated under reduced pressure, and the residual gum crystallized from ether. Yield: 3.5 g. of N-(5-methylthiophene-2-methylene) erythromycylamine. On drying crystallinity was lost, the M.P. of 140–145° C. being therefore only approximate.

*Analysis.*—Calculated (percent): C, 61.2; H, 8.8; N, 3.3. Found (percent): C, 60.9; H, 8.8; N, 3.3.

EXAMPLE 2

In a similar manner to that of Example 1, the following compounds were synthesized:

N-(3-indolylmethylene) erythromycylamine, M.P. 163–170° C.

*Analysis.*—Calculated (percent): C, 64.1; H, 8.8; N, 4.9. Found (percent): C, 64.3; H, 8.9; N, 4.6.

N-(1-phenyl-2,5-dimethylpyrrolyl-3-methylene) erythromycylamine, M.P. 158–165° C.

*Analysis.*—Calculated (percent): C, 65.5; H, 8.9; N, 4.6. Found (percent): C, 65.6; H, 9.1; N, 4.4.

N-2-furfurylidene erythromycylamine, M.P. 145–150° C.

*Analysis.*—Calculated (percent): C, 62.0; H, 8.9; N, 3.4. Found (percent) C, 61.8; H, 9.2; N, 3.2.

N-(pyrrolyl-2-methylene) erythromycylamine, M.P. 140–146° C.

*Analysis.*—Calculated (percent): C, 62.1; H, 9.1; N, 5.2. Found (percent): C, 61.8; H, 9.5; N, 5.0.

N-(thiophene-2-methylene) erythromycylamine, M.P. 156–162° C.

*Analysis.*—Calculated (percent): C, 60.8; H, 8.8; N, 3.4. Found (percent): C, 61.0; H, 9.0; N, 3.3.

N-[3-(2-furyl) acrylidene] erythromycylamine, M.P. 215–217° C.

*Analysis.*—Calculated (percent): C, 63.0; H, 8.9; N, 3.3. Found (percent): C, 62.7; H, 9.1; N, 3.1.

N-(5-bromoindolyl-3-methylene) erythromycylamine, M.P. 174–180° C.

*Analysis.*—Calculated (percent): C, 58.7; H, 7.9; N, 4.5. Found (percent): C, 58.7; H, 7.9; N, 4.3.

N-(5-methylindolyl-3-methylene) erythromycylamine, M.P. 155–165° C.

*Analysis.*—Calculated (percent): C, 64.4; H, 8.9; N, 4.8. Found (percent): C, 64.6; H, 9.1; N, 4.5.

EXAMPLE 3

Using the same procedure as described in Examples 1 and 2 but employing erythromycyl B amine, epi-erythromycylamine or epi-erythromycyl B amine, the following compounds are prepared:

N-(5-methylthiophene-2-methylene) erythromycyl B amine
N-(3-indolylmethylene) epi-erythromycyl B amine
N-(1-phenyl-2,5-dimethylpyrrolyl-3-methylene) epi-erythromycylamine
N-2-furfurylidene erythromycyl B amine
N-(pyrrolyl-2-methylene) epi-erythromycylamine
N-(thiophene-2-methylene) epi-erythromycyl B amine
N-[3-(2-furyl) acrylidene] erythromycyl B amine
N-[3-(2-thienyl) acrylidene] epi-erythromycylamine
N-[3-(2-furyl) acrylidene] epi-erythromycyl B amine
N-(5-bromoindolyl-3-methylene) erythromycyl B amine
N-(5-methylindolyl-3-methylene) erythromycyl B amine

EXAMPLE 4

A solution containing erythromycylamine (6.8 mmoles) and 1-benzylindole-3-aldehyde (6.8 mmoles) was treated as in Example 1 to give N-(1-benzylindole-3-methylene) erythromycylamine as a gum. To the gum (2.5 g.) in solution in methanol (20 ml.) was added slowly at room temperature sodium borohydride (0.05 g.). The resultant mixture was stood at room temperature for 2 hours, then made acid (pH 2.0) for 3 minutes and extracted with ether after being made strongly basic. Trituration with ether gave N-[(1-benzyl-indol-3-yl)methyl]erythromycylamine, yield 2.0 g., M.P. ≃ 160° C.

*Analysis.*—Calculated (percent): C, 66.7; H, 8.8; N, 4.4. Found (percent): C, 66.5; H, 8.5; N, 4.4.

EXAMPLE 5

Using the reduction procedure of Example 4, the Schiff's bases of Examples 2 and 3 were reduced to yield:

N-[(5-methylthien-2-yl)methyl] erythromycylamine
N-[(indol-3-yl)methyl] erythromycylamine, M.P. ≃140° C.
N-[(1-phenyl-2,5-dimethylpyrrol-3-yl)methyl] erythromycylamine
N-[(furfur-2-yl)methyl] erythromycylamine
N-[(pyrrol-2-yl)methyl] erythromycylamine
N-[(thien-2-yl)methyl] erythromycylamine
N-[3-(2-furyl)allyl] erythromycylamine, M.P. ≃120° C.
N-[(5-bromoindol-3-yl)methyl]erythromycylamine
N-[(5-methylindol-3-yl)methyl]erythromycylamine, M.P. ≃150° C.
N-[(5-methylthien-2-yl)methyl] erythromycyl B amine
N-[(indol-3-yl)methyl]epi-erythromycyl B amine
N-[(1-phenyl-2,5-dimethylpyrrol-3-yl)methyl] epi-erythromycylamine
N-[(furfur-2-yl)methyl] erythromycyl B amine
N-[(pyrrol-2-yl)methyl] epi-erythromycylamine
N-[(thien-2-yl)methyl]epi-erythromycyl B amine
N-[3-(2-furyl)allyl] erythromycyl B amine
N-[3-(2-thienyl)allyl] epi-erythromycylamine
N-[3-(2-furyl)allyl]epi-erythromycyl B amine
N-(5-bromoindol-3-yl)methyl] erythromycyl B amine
N-[(5-methylindol-3-yl)methyl] erythromycyl B amine

I claim:
1. Compound of the formula:

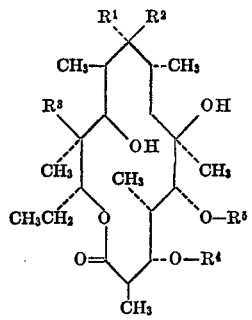

wherein $R^3$ is hydrogen or hydroxyl; $R^4$ is a cladinosyl group; $R^5$ is a desosaminyl group; and one of $R^1$ and $R^2$ is hydrogen and the other is a group of the formula:

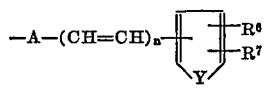

wherein A is an —N=CH— or —NH—CH₂— chain; $n$ is 0 or 1; $R^6$ and $R^7$ separately represent hydrogen, nitro, chloro, bromo, phenyl, $C_{1-4}$ alkyl or $C_{1-4}$ alkoxy or, when in adjacent positions, together represent a

chain optionally substituted by chloro, bromo, or $C_{1-4}$ alkyl; and Y represents O, S or $NR^8$ where $R^8$ is hydrogen, $C_{1-4}$ alkyl, phenyl or phenyl $C_{1-4}$ alkyl.

2. Compound as claimed in claim 1, wherein one of $R^1$ and $R^2$ is hydrogen and the other is a group of the formula wherein A and $n$ are as defined in claim 1:

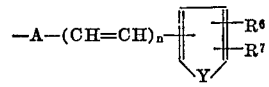

$R^6$ and $R^7$ separately represent hydrogen, chlorine, bromine or methyl, or together represent a

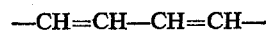

chain optionally substituted by chlorine, bromine or methyl; and Y represents O, S or $NR^8$ where $R^8$ is hydrogen, methyl, phenyl or benzyl.

3. Compound as claimed in claim 1, said compound being N-(5-methylthiophene-2-methylene)-erythromycylamine.

4. Compound as claimed in claim 1, said compound being N-(1-phenyl-2,5-dimethylpyrrolyl-3-methylene)-erythromycylamine.

5. Compound as claimed in claim 1, said compound being N-(5-bromoindolyl-3-methylene)-erythromycylamine.

6. Compound as claimed in claim 1, said compound being N-[3-(2-furyl) acrylidene]-erythromycylamine.

7. Compound as claimed in claim 1, said compound being N-[(5-methylindol-3-yl) methyl]-erythromycylamine.

8. Compound as claimed in claim 1, said compound being N-(thiophene-2-methylene)erythromycylamine.

9. Compound as claimed in claim 1, said compound being N-(pyrrolyl-2-methylene)erythromycylamine.

10. Compound as claimed in claim 1, said compound being N-(indolyl-3-methylene)erythromycylamine.

11. Compound as claimed in claim 1, said compound being N-(5-methylindolyl-3-methylene)erythromycylamine.

12. Compound as claimed in claim 1, said compound being N-2-furfurylidene erythromycylamine.

13. Compound as claimed in claim 1, said compound being N-[(indol-3-yl)methyl]erythromycylamine.

14. Compound as claimed in claim 1, said compound being N-[(1-benzylindol-3-yl)methyl]erythromycylamine.

References Cited

UNITED STATES PATENTS 3,660,376   5/1972   Massey _____ 260—210 E

JOHNNIE R. BROWN, Primary Examiner

U.S. Cl. X.R.

424—181

UNITED STATES PATENT OFFICE
CERTIFICATE OF CORRECTION

Patent No. 3,794,635      Dated February 26, 1974

Inventor(s) Delme Evans

It is certified that error appears in the above-identified patent and that said Letters Patent are hereby corrected as shown below:

Column 2, line 36, "in vitro and vivo" should read --in vitro and in vivo--.

Column 2, line 49, "in rate" should read --in rates--.

Signed and sealed this 30th day of July 1974.

(SEAL)
Attest:

McCOY M. GIBSON, JR.
Attesting Officer

C. MARSHALL DANN
Commissioner of Patents